Figure 1:
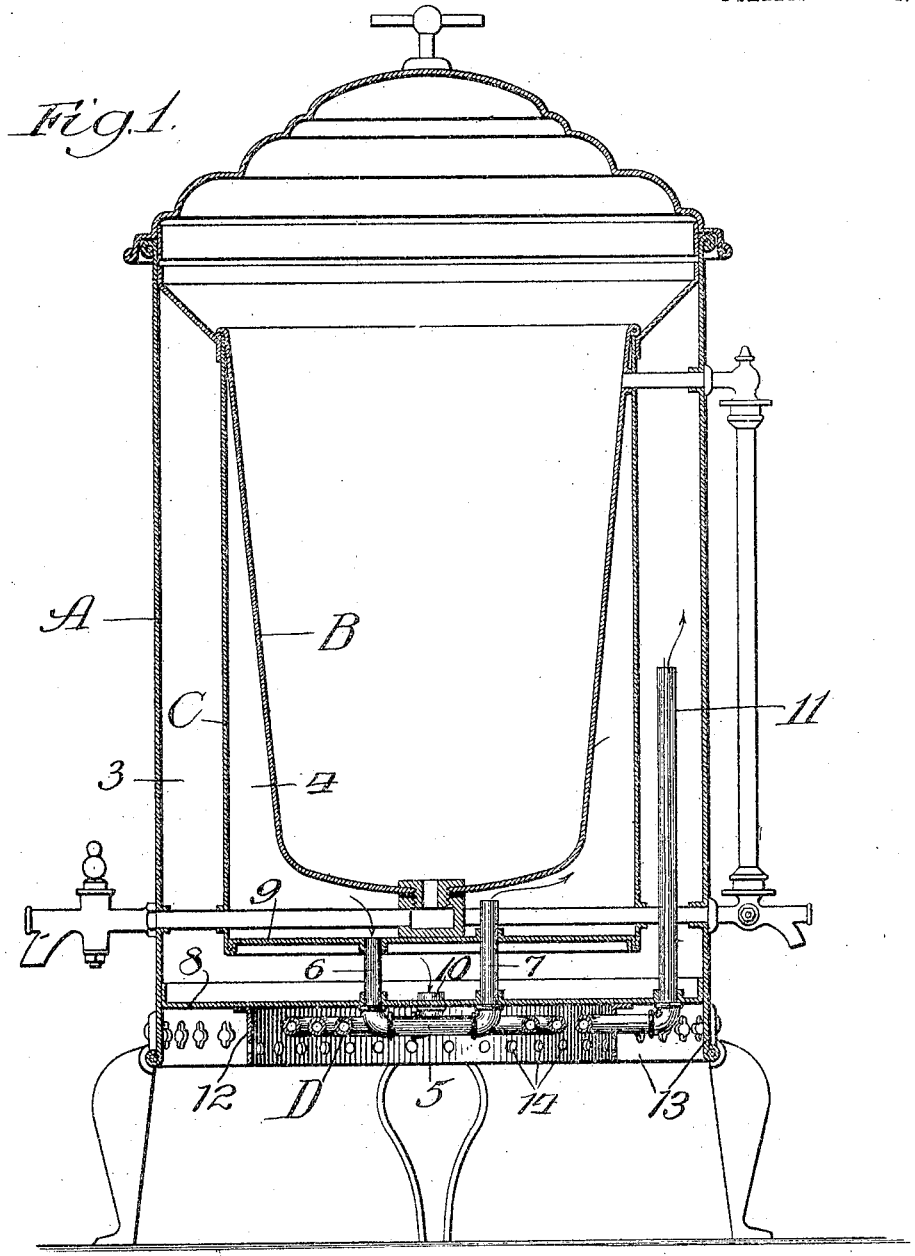

No. 798,010. PATENTED AUG. 22, 1905.
T. H. CARMICHAEL.
VESSEL FOR HEATING LIQUIDS.
APPLICATION FILED NOV. 21, 1904.

2 SHEETS—SHEET 1.

Witnesses:
E. E. Gaylord.
John Enders.

Inventor:
Thomas H. Carmichael,
By L. B. Coupland.
Atty.

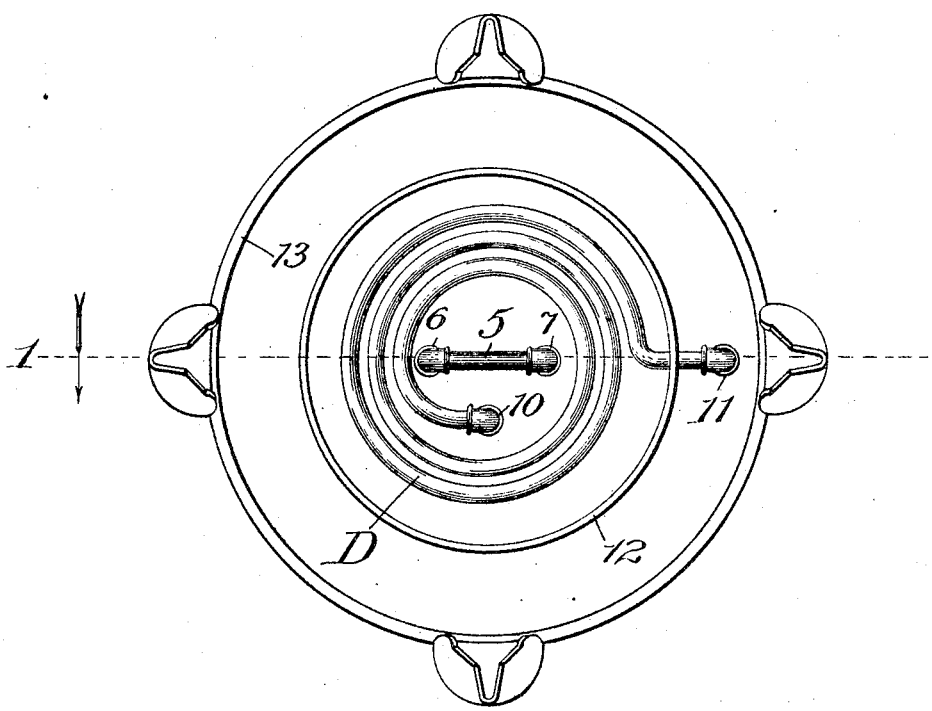

UNITED STATES PATENT OFFICE.

THOMAS H. CARMICHAEL, OF CHICAGO, ILLINOIS.

VESSEL FOR HEATING LIQUIDS.

No. 798,010.  Specification of Letters Patent.  Patented Aug. 22, 1905.

Application filed November 21, 1904. Serial No. 233,683.

*To all whom it may concern:*

Be it known that I, THOMAS H. CARMICHAEL, a citizen of the United States, residing at Chicago, in the county of Cook and State of Illinois, have invented new and useful Improvements in Vessels for Heating Liquids, of which the following is a specification.

This invention relates to improvements in vessels for heating liquids, and is more especially intended for application in connection with coffee, tea, and hot-water urns used in hotels, restaurants, and other places, and has for its object to provide an arrangement whereby the liquid contents may be conveniently maintained at a uniform temperature with the least possible expenditure of gas or other heating agent employed.

A further object is to confine the burner-flame within a certain area and concentrate the same on the surface to be heated and also prevent the flame and heat from spreading out laterally and escaping up the outer sides of the vessel and discoloring and tarnishing the exterior surface thereof.

In the drawings, Figure 1 is a vertical section of an apparatus embodying the improved features on line 1, Fig. 2, looking in the direction indicated by the arrow; and Fig. 2 is a bottom plan.

The general construction and arrangement of the apparatus shown is somewhat similar to that of others. The description will therefore be limited to the improved features.

An apparatus of this class usually consists of an outer and an inner vessel with an intervening water-space. In this instance three vessels are used, providing two water compartments instead of but one.

A represents the outer vessel, B the inside one, and C an intermediate vessel. The inside vessel B is usually composed of porcelain and the others of metal. The vessel B is intended as the receptacle proper for coffee, tea, or other liquid refreshment to be maintained in a heated condition. The vessel C, surrounding vessel B, is filled with water, as is the outside vessel A, inclosing vessel C. The spaces 3 and 4 between the vessels form separate compartments, between which there is no communication, each space being provided with means for maintaining an independent circulation in keeping the body of liquid moving in bringing the same in contact with the heating-surfaces, a water-circulating device loop consisting of a horizontal tube 5, a vertical branch tube 6, connected with one end thereof, and a companion vertical tube 7, connected with the other end. The horizontal tubular part 5 is located underneath the bottom 8 of the outside vessel A, the vertical branch tubes 6 and 7 extending upward therethrough and through the bottom 9 of the intermediate vessel C and opens up inside thereof, as shown in Fig. 1. The vertical tube 7 opens on a higher level than that of the companion tube 6 in overcoming the inertia and providing for a proper circulation of the heating body of liquid contained in vessel C. In practical working the water in vessel C flows down through tube 6 and returns upward through tube 7, as indicated by the arrows. A gas or other burner (not shown) will be located under the horizontal pipe part 5 and provides the required heating medium, which can be conveniently regulated to maintain the liquid contents at the desired temperature. When it is available, steam may be employed as the heating agent.

A pipe-coil D is located under the bottom of the apparatus and has its respective ends 10 and 11 open up through into the water-space 3 between the outer vessel A and the intermediate vessel C, inclosed thereby. The intake end 10 of coil D opens down near the interior bottom of the vessel A, the return-discharge end 11 terminating at a higher level in providing for the required circulation. The coil D presents a larger area of heating-surface than that of the tubular device provided for heating the body of water between the inner receptacle B and the vessel C, for the reason that the water in the outside vessel A is changed oftener. The body of water in the space 4 between the inside receptacle and vessel C is only intended to maintain the contents of the inside vessel in a heated condition and is not drawn out for other uses, so that when once heated but little expenditure of gas or other heating means is necessary to keep an even temperature. The body of water in the outside vessel A heated by the coil D is intended to be drawn upon when it is necessary to dilute the substance or refreshment served from the inside receptacle B. This drawing off at irregular intervals and as gradually replenishing the water in the outside vessel does not appreciably affect the temperature of the contents of vessel B on account of the intermediate volume of hot water contained in vessel C.

A ring 12 is secured to the exterior bottom of the outside vessel and is of a less diameter than that of the vessel edge rim 13. This ring incloses the heating-pipe coils and the gas-burner or other direct heating device and prevents the flame from spreading laterally and passing along up the sides of the outside vessel A and discoloring or tarnishing the finished polished surface thereof. Unless prevented the heat from the burner-flame soon discolors the nickeled surface, and a great deal of labor is required in keeping the exterior surfaces of the urns in polished presentable condition. The ring 12 also aids in concentrating the heat on the pipe-coils and is provided with a number of perforations 14 to promote proper combustion.

It will be noted by this arrangement that the volume of water in the outside vessel and the intermediate vessel have independent heating devices with no open communication between, the inside vessel, containing the coffee, tea, or other liquid refreshment, being heated indirectly.

Having thus described my invention, what I claim is—

1. An apparatus of the class described comprising an outer vessel, an inside vessel and an intermediate vessel, and means for heating the contents of the outside and intermediate vessels independently from each other.

2. An apparatus of the class described, comprising an outer vessel, an inner, and an intermediate vessel separated by water compartments or spaces with no communication between, and means for independently heating the liquid contained in said spaces.

3. In an apparatus of the class described, an outside vessel, an inside vessel, an intermediate vessel with independent compartments or spaces between for containing a liquid-heating medium, and means for independently heating the contents of said compartments.

4. In an apparatus of the class described, comprising an outer, an inner, and an intermediate vessel, separated by compartments having no communication with each other, means for heating the liquid contents contained in the space between the inside vessel and the one adjacent thereto, and means independent from the first-named means for heating the liquid contained in the space between the outside vessel and the one next inside thereof.

5. In an apparatus of the class described, an outside vessel, a second vessel located inside thereof, a third vessel located inside of the second vessel with an intervening space between each, a liquid heating and circulating device, consisting of a horizontal tube and vertical tubes connected to the respective ends of the horizontal tube and opening up inside of the space between the inside vessel and the vessel next thereto, and a heating and circulating coil having its respective ends open into the space between the outside vessel and the one next inside thereof.

In testimony whereof I have signed my name to this specification in the presence of two subscribing witnesses.

THOMAS H. CARMICHAEL.

Witnesses:
   L. B. COUPLAND,
   G. E. CHURCH.